United States Patent [19]

Rohr et al.

[11] Patent Number: 5,340,560
[45] Date of Patent: Aug. 23, 1994

[54] METHOD FOR MAKING FUMED SILICA HAVING A REDUCED AGGREGATE SIZE AND PRODUCT

[75] Inventors: Donald F. Rohr, Charlton; Stanlee T. Buddle, Gloversville; Paul R. Wilson, Scotia; Michael A. Zumbrum, Clifton Park, all of N.Y.

[73] Assignee: General Electric Company, Schenectady, N.Y.

[21] Appl. No.: 54,477

[22] Filed: Apr. 30, 1993

[51] Int. Cl.$^5$ ............................................. C01B 33/12
[52] U.S. Cl. ................... 423/337; 423/336; 106/489; 501/133
[58] Field of Search ............... 423/336, 337; 501/133; 106/489

[56] References Cited

U.S. PATENT DOCUMENTS

| | | | |
|---|---|---|---|
| 3,486,913 | 12/1969 | Zirngibl et al. | 423/337 |
| 3,645,684 | 2/1972 | De Cuir | 423/336 |
| 3,660,025 | 5/1972 | Driscoll | 423/336 |
| 3,953,487 | 4/1976 | Kratel et al. | 260/448.2 E |
| 3,954,945 | 5/1976 | Lange et al. | 423/336 |
| 4,036,938 | 7/1977 | Reed | 423/336 |
| 4,038,370 | 7/1977 | Tokimoto et al. | 423/336 |
| 4,048,290 | 9/1977 | Lee | 423/336 |
| 4,108,964 | 8/1978 | Kratel et al. | 423/336 |
| 4,292,290 | 9/1981 | Tunison, III | 423/336 |
| 4,565,682 | 1/1986 | Loskot et al. | 423/336 |

FOREIGN PATENT DOCUMENTS

| | | | |
|---|---|---|---|
| 58-140313 | 8/1983 | Japan | 423/337 |
| 1121279 | 7/1968 | United Kingdom | 423/337 |

Primary Examiner—Gary P. Straub
Assistant Examiner—N. M. Nguyen
Attorney, Agent, or Firm—William A. Teoli; William H. Pittman

[57] ABSTRACT

A method is provided for making fumed silica aggregate having an average convex perimeter in the range of about 0.12 micron to about 0.6 micron based on the combustion of a mixture of a silicon compound, such as an organosilane, an oxygen containing gas, such as air and a fuel such as hydrogen. The fumed silica aggregate has been found to enhance properties in heat curable filled silicone compositions.

5 Claims, 1 Drawing Sheet

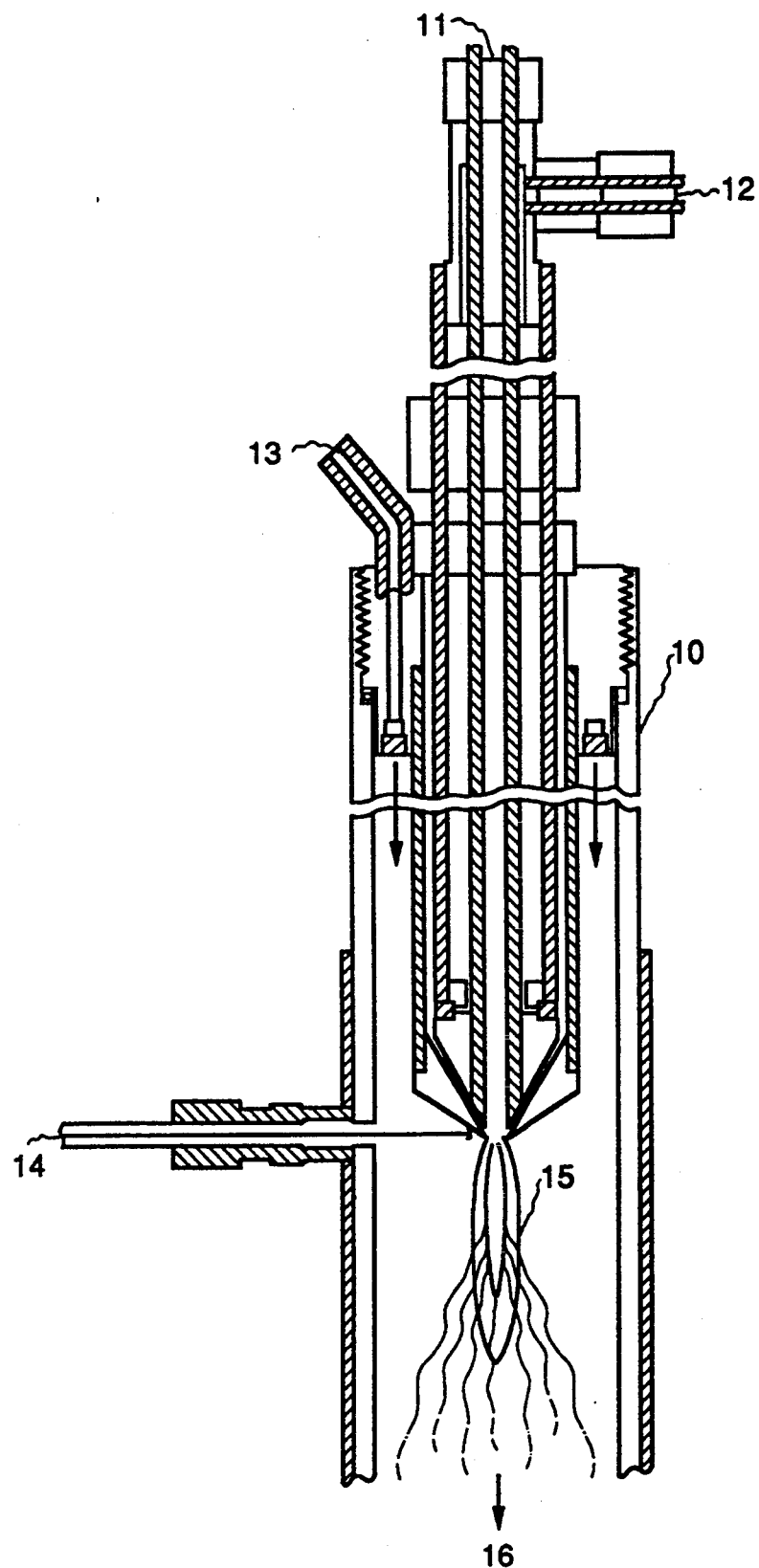

METHOD FOR MAKING FUMED SILICA HAVING A REDUCED AGGREGATE SIZE AND PRODUCT

CROSS REFERENCE TO RELATED APPLICATION

Reference is made to copending application Ser. No. 08/054,475 filed concurrently herewith.

BACKGROUND OF THE INVENTION

The present invention relates to a method for making fumed silica and product obtained therefrom. More particularly, the present invention relates to burning a mixture of a fuel, such as hydrogen, a silicon compound, such as a silane or an organosilane, and oxygen or an oxygen containing gas in a combustion chamber to produce aggregates having an average convex perimeter in the range of about 0.12 micron to about 0.60 micron.

Prior to the present invention, various procedures were used to prepare finely divided silicon dioxide by burning a mixture of an organohalosilane, hydrogen and an oxygen containing mixture. Some of these methods are shown by Lange et al, U.S. Pat. 3,954,945, Lee, U.S. Pat. No. 4,048,290 and Kratel et al, U.S. Pat. No. 4,108,964.

Existing methods for making finely divided metal oxides, such as hydrophilic silicon dioxide are generally based on a procedure involving feeding a combustible mixture of a metal or metalloid halide, hydrogen, and an oxygen-containing gas such as air, to a burner in a combustion chamber, which results in the production of primary metal oxide particles, such as particles of silicon dioxide. The primary metal oxide particles form aggregates having an average convex perimeter of about 0.5 micron to 1.5 microns which can often exceed the optimum average aggregate size desired in particular applications. The term "convex perimeter" is defined hereinafter as the average circumferential distance from high point to high point around the aggregate measured from TEM micrographs.

A method for reducing aggregate size is shown by Kratel et al, U.S. Pat. No. 3,953,487. The Kratel et al process involves reducing aggregate size by subjecting hydrophobic silicon dioxide aggregates composed of interlaced chains of primary $SiO_2$ particles to a mechanical impact treatment. Size reduction is used in combination with water and in further combination with an organosilicon compound, such as hexamethyldisilazane. The reduced hydrophobic silicon dioxide aggregates have been found to have a smaller average convex perimeter. It would be desirable to provide alternate methods for directly making fumed silicon dioxide aggregates which did not require an additional milling step.

SUMMARY OF THE INVENTION

The present invention is based on the discovery that fumed silica aggregate having a surface area in the range of from 75–500 $m^2/g$ and an average convex perimeter in the range of between about 0.12 micron to 0.60 micron can be made directly without resort to mechanical attrition during the production of the fumed silica.

It has been found that fumed silica having an aggregate size with an acceptable average convex perimeter can be made if a combustible mixture of a silicon compound, such as an organosilane is used having a particular mole percent range of the silicon compound, based on the total moles of silicon compound and elemental components, such as hydrogen and oxygen. The silicon compound mixture is fed into a combustion chamber through a nozzle at a gas pressure which is at least sufficient to maintain a flame at a temperature in the range of 1400° C. to 2000° C.

STATEMENT OF THE INVENTION

There is provided by the present invention, a method for making fumed silica aggregate having a surface area in the range of 75–500 $m^2/g$, and an average convex perimeter in the range of about 0.12 micron to about 0.60 micron, which comprises feeding into a combustion chamber, a gaseous combustible mixture comprising a silicon compound selected from the group consisting of a silane, organosilane, or mixture thereof, and sufficient oxygen to produce a flame having a calculated adiabatic flame temperature in the range of about 1,400° C. to 2,000° C. where the gaseous combustible mixture, comprises from about 0.05 to 2.5 mole % of the silicon compound based on the total moles in the combustible mixture of the silicon compound and elements in a mixture selected from the group consisting of, (a) a mixture of oxygen and hydrogen, and
(b) a mixture of oxygen, hydrogen, and nitrogen.

Some of the silanes or organosilanes which can be utilized as the silicon compound in the practice of the present invention to make small-aggregate fumed silica are for example, $SiH_4$, $SICl_4$, $CH_3SiCl_3$, $CH_3SiHCl_2$, $HSiCl_3$, $(CH_3)_2SiCl_2$, $(CH_3)_3SiCl$, $(CH_3)_2SiH_2$, $(CH_3)_3SiH$, and $(C_2H_5)_2SiH_2$.

BRIEF DESCRIPTION OF THE DRAWING

FIG. 1 is a sectional view of a combustion chamber used to produce fumed silica aggregate.

DESCRIPTION OF THE PREFERRED EMBODIMENTS

There is shown in the drawing a sectional view of fumed silica aggregate being formed in a combustion chamber resulting from the burning of an oxygen containing mixture having present a silicon compound or silicon compounds, such as a combustible organosilane mixture.

More particularly, there is shown at 10, a burner, having a conduit at 11 for introducing a mixture of a silicon compound, a fuel, such as hydrogen, methane or natural gas, and air, at 12, a duct for the fuel, and at 13 a duct for quench air. A thermocouple is shown at 14 and a flame at 15. Fumed silica is shown at 16, which is drawn by a vacuum system and collected on a filter not shown.

The thermodynamics of forming fumed silica aggregate having a substantially reduced convex perimeter in accordance with the practice of the invention without resort to mechanical attrition is not completely understood. One possible explanation is that primary particles of fumed silicon dioxide are initially produced which thereafter form into aggregates based on such factors as flame temperature and molar composition of the feed. Another contributing feature is feed rate which should be at least sufficient to maintain a flame. It also has been found desirable to calcine the aggregate after it has been formed at temperatures in the range of 400° C. to 600° C. to substantially eliminate by products, such as residual HCL, in instances where organochlorosilane is used.

The fumed silica aggregate made in accordance with the practice of the invention can have a surface area in the range of about 75 $m^2/g$ to about 500 $m^2/g$ and preferably 125 $m^2/g$ to 500 $m^2/g$. Various silicon compound containing combustible mixtures can be burned to produce fumed silica aggregate in accordance with the invention. Preferable, a silicon compound, such as $CH_3SiCl_3$ can be used or a mixture of $CH_3SiCl_3$ and $SiHCl_3$. In instances where $CH_3SiCl_3$ is burned, a mixture can be used having 5 to 30 mole % hydrogen, 5 to 90 mole % oxygen, 0 to 80 mole % nitrogen and 0.05 to 2.5 mole % $CH_3SiCl_3$.

A mixture of about 60 wt % of $CH_3SiCl_3$ and about 40 wt % of $SiHCl_3$ within about a 1.3 to 1.5 mole % range can be satisfactorily used with about 55 to 70 mole % nitrogen, about 15 to about 20 mole % oxygen and about 10 to about 25 mole % hydrogen.

Some of the fumed silica can be used in reinforcing heat curable silicone rubber, such as liquid injection molding or "LIM" compositions.

In order that those skilled in the art will be better able to practice the present invention the following examples are given by way of illustration and not by way of limitation. All parts are by weight.

EXAMPLE 1

A mixture of air, which had been preheated to approximately 55° C., hydrogen and methyltrichlorosilane was fed into a downward-directed burner having a 3.18 mm diameter. All gas flow rates were monitored and controlled with MKS flow meters of the MKS Instrument Incorp., Andover, Mass. The liquid methyltrichlorosilane feed was monitored with a Micromotion (Micromeretics Corp. of Boulder, CO) flow meter calibrated for the low end of its 0-50 g/min span. An annulus guard flame was maintained by feeding hydrogen in a concentric ring around the inner burner tube. Quench air was introduced approximately 20 cm upstream of the burner tip. The combustion products were contained inside a 4.08 cm (ID) Hastelloy reactor vessel and conveyed by a jet ejector vacuum system down stream of the reactor. For sampling purposes, a vessel containing a sintered metal filter (3.5 cm diameter×30 cm in length) was placed in-line between the reactor and the jet ejector. The filter accumulated fumed silica and allowed the by-product gases to pass through. About 1.5 g of fumed silica could be collected before the pressure drop from the cake was too great for the vacuum system to operate. The sample was then scraped from the filter element and calcined in a separate oven at 500° C. under air to produce Sample (A). In addition, the flow rate and the composition of the feed mixture was altered to produce a larger aggregate fumed silica, Sample (B). The convex perimeter of Sample (A), made in accordance with the invention, was compared to fumed silica which was made in the same apparatus using a feed mixture outside the scope of the invention, Sample (B) and a commercial fumed silica "Cabot" M5 made by the Cabot Company of Tusscola, IL.

The convex perimeter of Sample A and B were measured using image analysis of transmission electron micrographs and the values are shown as follows:

TABLE I

| | Convex Perimeter | | Flame Temp (°C.) |
|---|---|---|---|
| | Aggregate Distribution | | |
| | Mean$\mu$ | Std. Dev.$\mu$ | |
| A | 0.38 | 0.25 | 1900 |
| B | 0.76 | 0.43 | 1805 |
| Cabot M5 | 0.80 | 0.69 | |

The surface area of A was found to be 132 $m^2/g$; the surface area of B was found to be 154 $m^2/g$; the surface area of Cabot M5 was 200 $m^2/g$.

The flow rates and mole % composition of the feeds used in making samples A and B are shown as follows, where "Mtri" is methyltrichlorosilane:

TABLE II

| | Mtri g/min | $H_2$ g/min | $O_2$ g/min | $N_2$ g/min |
|---|---|---|---|---|
| Flow Rates | | | | |
| A | 1.000 | 0.402 | 4.497 | 14.803 |
| B | 4.94 | 0.036 | 2.999 | 9.869 |
| Mole Percent | | | | |
| A | 0.76% | 22.90% | 16.03% | 60.31% |
| B | 6.65% | 3.59% | 18.85% | 70.91% |

EXAMPLE 2

There was added 3 parts of water to 70% by weight of a dimethylvinyl terminated polydimethylsiloxane having a viscosity of 40,000 centipoise at 25° C; the resulting mixture was compounded for 15 minutes. There was then added 25 parts of the fumed silica aggregate of Example 1 having an average convex perimeter in the range of about 0.38 micron. The fumed silica aggregate was added portion-wise in ⅓ increments along with hexamethyldisilazane; it was mixed for 30 minutes after each addition. The in-situ treatment of the fumed silica aggregate was completed by mixing the batch for two hours at 70°-90° C. Volatiles, such as hexamethyldisiloxane and ammonia were removed during a two hour cook at 145° C. under vacuum.

The remaining 30 % by weight of the above dimethylvinyl siloxane polymer was added to the batch along with cooling to 80° C. There was then added to the mixture, 4 parts of a low viscosity vinyl containing polydimethylsiloxane having a viscosity of 500 centipoise at 25° C. and chain-stopped with a trimethylsiloxy unit and a dimethylvinylsiloxy unit, 4 parts of a vinyl containing polydimethylsiloxane having a viscosity of 500 centipoise at 25° C. which had approximately 1.65 weight % vinyl groups attached to silicon by carbon-silicon linkages and consisted essentially of dimethylsiloxy units, methylvinylsiloxy units and terminated with dimethylvinylsiloxy units. In addition, there was added one part of a mold release agent in the form of a silanol containing MQ resin having $(CH_3)_3SiO_{\frac{1}{2}}$ units and $SiO_2$ units; the resulting mixture was blended for 10 minutes after each addition. There was then added, 20 ppm of platinum in the form of a platinum complex shown by Karstedt, French patent 1548775. The resulting formulation was designated Part A.

A silicone part B formulation was prepared by mixing 96.7 parts of the above polydimethylsiloxane/filler base with 3.3 parts of a silicon hydride cross-linker consisting essentially of a resin of condensed dimethylhydrogensiloxy units, dimethylsiloxy units and tetrasiloxy units blended with a hydrogen containing polydimethylsiloxane consisting essentially of condensed dimethylsiloxy units and methylhydrogensiloxy units and chainterminated with dimethylhydrogensiloxy units. The silicon hydride cross-linker and polymethylsiloxane/filler base was blended with 0.2 part of 1-ethynyl-1-cyclohexanol for 10 minutes. The resulting silicon hydride siloxane formulation was designated part B. The respective A and B mixtures were then filtered through screen packs.

A liquid injection moldable silicone composition was prepared by mixing 100 parts of Part A with 100 parts of Part B. After 5 minutes, the resulting liquid injection moldable silicone was placed in a 6 ounce Semco cartridge. A pressure of 90 psi was applied to the mixture forcing it through an $\frac{1}{8}''$ diameter orifice to measure its flow rate. It had a flow rate of 300 g/per minute. The silicone LIM composition containing the fumed silica aggregate in-situ treated with silazane had a 35 Shore A, 600 Tensile (psi), 440 elongation (%) and 60 Tear (lb/in).

Although the above examples are directed to only a few of the very many variables which can be used in the practice of the present invention, it should be understood that the present invention is directed to a much broader method for making fumed silica aggregate, and the silicone compositions containing such aggregate.

What is claimed is:

1. A method for making fumed silica aggregate having a surface area in the range of 75–500 $m^2/g$, and an average convex perimeter in the range of about 0.12 micron to about 0.60 micron, which comprises feeding into a combustion chamber, quench air and a gaseous combustible mixture, where the gaseous combustible mixture comprises a mixture of a silicon compound selected from the group consisting of a silane, organosilane, and mixtures thereof, and a mixture of elements selected from the group consisting of, (a) oxygen and hydrogen and
   (b) oxygen, hydrogen and nitrogen, and there is present in the gaseous combustible mixture from about 0.05 to about 2.5 mole % of the silicon compound based on the total moles in the gaseous combustible mixture and sufficient oxygen in the gaseous combustible mixture to produce a flame in the combustion chamber having calculated adiabatic flame temperature in the range of about 1400° C. to 2000° C. combusting said gaseous combustible mixture at an adiabatic temperature of about 1400° C. to 2000° C. to produce said fumed silica aggregate; recovering said fumed silica aggregate.

2. A method in accordance with claim 1 where the silicon compound used in the gaseous combustible mixture is methyltrichlorosilane.

3. A method in accordance with claim 1, where the gaseous combustible mixture is methyltrichlorosilane, hydrogen and air.

4. A method in accordance with claim 1, where the convex perimeter of the fumed silica aggregate made is about 0.38 micron.

5. A method in accordance with claim 1, where the gaseous combustible mixture consists essentially of a mixture of about 60 wt % of $(CH_3)_3SiCl_3$ and about 40 wt % of $SiHCl_3$ within about a 1.3 to about 1.5 mole % range, about 55 to about 70 mole % nitrogen, about 15 to about 20 mole % oxygen, and about 10 to about 25 mole % hydrogen.

* * * * *